United States Patent [19]

Bishop et al.

[11] Patent Number: 4,758,268
[45] Date of Patent: Jul. 19, 1988

[54] METHOD AND APPARATUS FOR RECLAIMING METAL VALUES FROM ELECTRIC ARC FURNACE FLUE DUST AND SLUDGE AND RENDERING RESIDUAL SOLIDS RECYCLABLE OR NON-HAZARDOUS

[75] Inventors: Norman G. Bishop, Ruidoso, N. Mex.; N. Edward Bottinelli, Dallas, Tex.; Norman L. Kotraba, Tega Cay, S.C.

[73] Assignee: ZIA Technology, Inc., Dallas, Tex.

[21] Appl. No.: 946,550

[22] Filed: Dec. 23, 1986

[51] Int. Cl.⁴ .............................................. C22B 1/08
[52] U.S. Cl. ............................................ 75/25; 75/3
[58] Field of Search ................ 75/25, 3, 4, 5, 10.34, 75/10.38

[56] References Cited

U.S. PATENT DOCUMENTS

| | | | |
|---|---|---|---|
| 2,805,930 | 9/1957 | Udy | 75/10.34 |
| 3,150,958 | 9/1964 | Collin | 75/10.38 |
| 3,206,299 | 9/1965 | Senior | 75/10.34 |
| 3,656,735 | 4/1972 | Eliot | 266/901 |
| 3,938,987 | 2/1976 | Ban | 75/4 |
| 4,063,930 | 12/1977 | Kusner | 75/25 |

Primary Examiner—Peter D. Rosenberg
Attorney, Agent, or Firm—Ralph H. Dougherty

[57] ABSTRACT

A method for the pyrometallurgical treatment of environmentally hazardous steelmill flue dust and sludges to separate and recover the volatile heavy metals from the flue dust material and to convert the remaining iron into recyclable directly reduced iron pellets, or disposable non-hazardous reoxidized iron pellets, or pig iron or shot and slag. The dust is mixed with solid carbonaceous reductant and a binder, pelletized, optionally dried, and reduced in an inclined rotary reduction smelter vessel. The distilled heavy metals are reoxidized and may be selectively segregated to reduce the gangue and lead oxide contamination from the reconcentrated zind oxide dust. The reconcentrated heavy metal oxide dust is recycled by the zinc/lead industry.

16 Claims, 10 Drawing Sheets

METHOD AND APPARATUS FOR RECLAIMING METAL VALUES FROM ELECTRIC ARC FURNACE FLUE DUST AND SLUDGE AND RENDERING RESIDUAL SOLIDS RECYCLABLE OR NON-HAZARDOUS

BACKGROUND OF THE INVENTION

Direct reduction of iron-oxide ore in fine, lump, and pellet form is well known in metallurgical literature and patents for processes involving rotary kilns, shaft furnaces, fluidized beds, and retorts of various sizes and shapes. In general, such processes have evolved for the purpose of directly reducing ironoxide ore in solid-state form to metallized iron, commonly known as directly reduced iron, or "DRI", which can be easily melted in an electric arc furnace to produce high quality steel, having a low percentage of residual elements, or gangue.

"Metallized", as used throughout this specification does not mean coated with metal, but means nearly completely reduced to the metallic state, i.e., always in excess of 60% metal, and usually in excess of 90% metal in the material. Such metallized iron in many forms, including pellets, is well suited as feed material to steel-making furnaces such as an electric arc furnace.

Existing direct reduction processes are generally intended for high tonnage production rates on a continuous basis, with the end product being high grade DRI with metallization levels about 92 to 94 percent, and having a maximum residual gangue content of less than eight percent. While rotary kilns, in general, utilize solid forms of carbon such as lignite, coal, or coke to provide the reductant source, shafts furnaces, retorts, and fluidized bed furnaces normally utilize natural gas or oil to provide the reductant source.

Recent advancements in plasma melting technologies have resulted in the development of several new smelting processes capable of directly reducing and melting iron-oxide ore to produce pig iron or steel. These new processes for the most part are still in the experimental stage of development, and are dependent on low power costs to be economical. Plasma processes in the field of electric arc furnace flue dust reprocessing are primarily designed to recover only zinc and lead in crude metallic form while the iron contained in the material is melted in oxide form and becomes inseparable from the slag which must then be disposed of as solid waste.

Existing direct reduction processes designed to produce large annual tonnages of DRI for use as a remelt stock in electric arc furnaces steelmills, in general, cannot be economically downsized to meet the needs for "on-site" reprocessing of small tonnages of flue dust material. Recent development of direct reduction and direct smelting processes such as rotary kiln, rotary hearth, retort, and plasma furnaces each have possible on-site application where the economy-of sale is favorable. An apparatus and process which provides distillation and recovery of the heavy metal oxides contained in electric arc furnace flue dust as well as recovering metallic iron in the form of either DRI, or pig iron from the resulting slag on a small scale and at a low capital and operating cost would be beneficial. The majority of mini-steelmills, both in the United States and in the rest of the world, produce less than 10,000 tons per year of flue dust each.

The Resource Conservation and Recovery Act of 1976 ("RCRA"), and the NEW RCRA Hazardous and Solid Waste Amendments of 1984 for handling and disposing of waste materials listed by the U.S. Environmental Protection Agency as hazardous, establishes certain guidelines and deadlines with which producers of hazardous waste materials must be prepared to comply by Oct. 8, 1988. The Comprehensive Environmental Response, Compensation, and Liability Act ("CERCLA") establishes potential liabilities for clean-up of existing hazardous waste disposal sites and inorder to ensure compliance with these regulations as well as future regulations, and to avoid potential future liabilities, it is imperative that all producers of hazardous waste materials in "on-site" facilities in the future.

In view of existing technology available, and the economics of applying such technology, there remains the need for simple, low cost, safe, and effective processes for the treatment and conversion of waste materials classified as hazardous by the EPA into recyclable or non-hazardous disposable materials.

BRIEF DESCRIPTION OF THE INVENTION

This invention is a pyrometallurgical apparatus and process for the direct reduction of iron oxides, and the reduction, selective distillation, reoxidation, and recovery of volatile heavy metals (in oxide form) commonly found in steelmill electric arc furnace (EAF) flue dust. While the invention has the capability of effectively reducing any iron oxide form, such as naturally occurring iron ore, mill scale, blast furnace and BOF dust, the invention is specifically designed to meet the economic needs for "on-site" application at ministeel mills.

The invented process comprises the steps of preparing green ball pellets from flue dust and/or sludge, drying the pellets if necessary, heating and reducing the pellets in a rotary reduction smelter, melting the reduced pellets within the smelter, refining the molten, metallized material, and pouring or casting the molten material. An additional feature of the invention is the recovery of metal values from the off-gases from the smelter.

OBJECTS OF THE INVENTION

It is the principal object of this invention to provide a small-scale flue dust recovery plant that can be operated on a discontinuous basis, and without costly degradation to the systems refractories.

It is another object to provide economic application "on-site" at mini-steelmills for the purpose of recycling hazardous EAF flue dust into recyclable, and/or non-hazardous materials, such as directly reduced iron (DRI) pellets, or pig iron and slag, and a highly reconcentrated zinc and lead oxide dust/ore.

It is also an object to employ greenball pellets containing admixed solid carbon reductant directly in a hot rotating furnace without catastrophic degradation of the pellets, and dust regeneration.

Another object is to provide a method of operating the invention as a batch process to selectively distill and recover reconcentrated zinc oxide dust, lead oxide dust, and process gangue dust separately.

It is also an object to provide apparatus having sufficient operating flexibility to allow feed material to be converted to solid-state directly reduced iron (DRI), or to be melted to form liquid iron and slag, while distilling volatile heavy metals for subsequent recovery in an off-gas cooling and dust collection system.

It is also an object to provide means to convert hazardous waste flue dust which has no direct commercial value into marketable products and by-products, and non-hazardous waste materials that can be safely disposed of according to the EPA EP Toxicity Regulations.

It is another object of this invention to provide a variable operating furnace apparatus which can be selectively controlled either to melt the mass of feed material to form liquid iron and slag, or to stop short of melting and produce a solid state iron pellet, which can be recycled as remelting stock into an electric arc furnace.

It is also an object to provide means to terminate the existence of certain flue dust and sludge materials as hazardous waste.

BRIEF DESCRIPTION OF THE DRAWINGS

This invention is better understood by referring to the following detailed description and the appended drawings, wherein.

DETAILED DESCRIPTION

Figure 1:
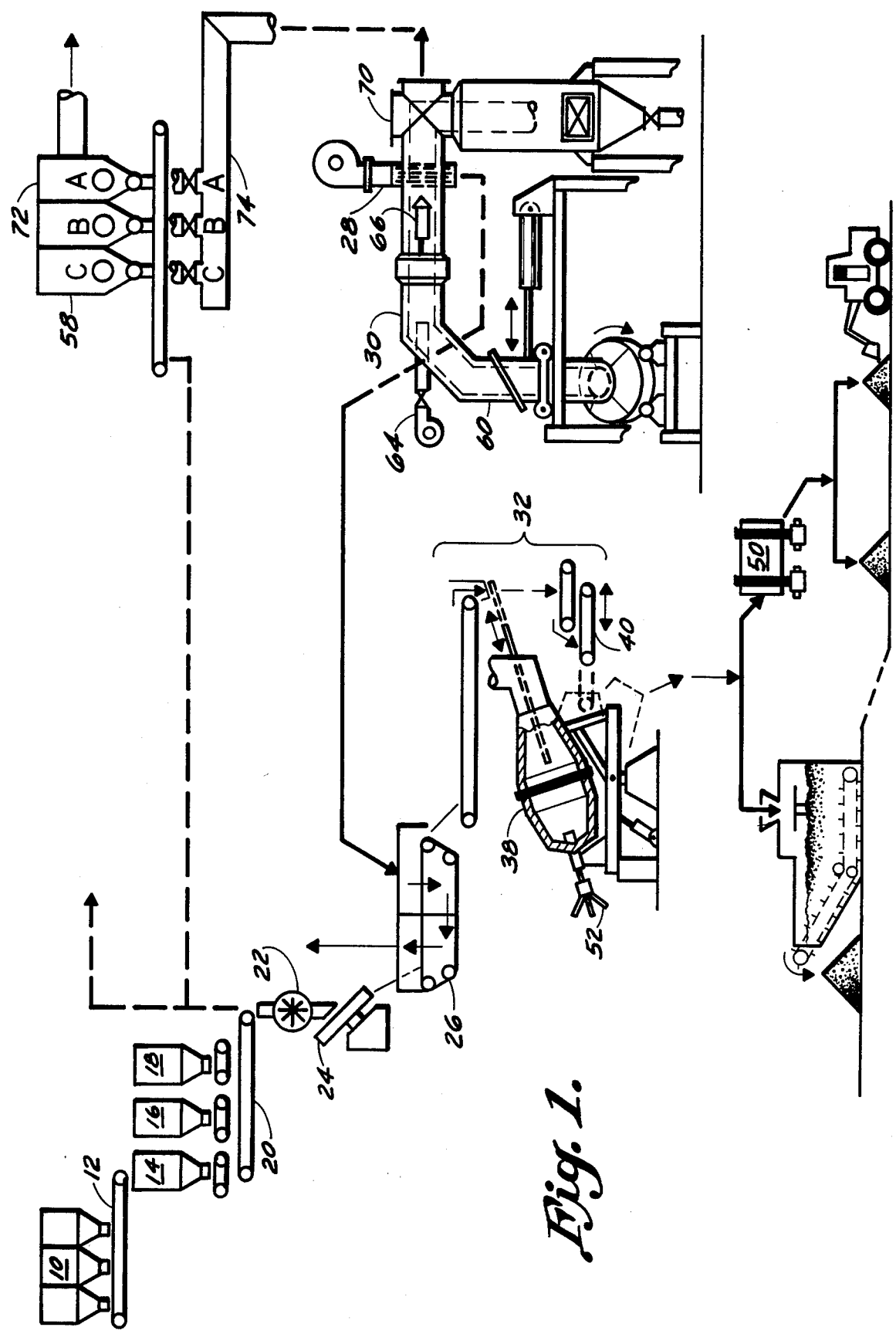
FIG. 1 is a process flow diagram illustrating the relationships of the various pieces of apparatus employed in this invention.
Figure 2:
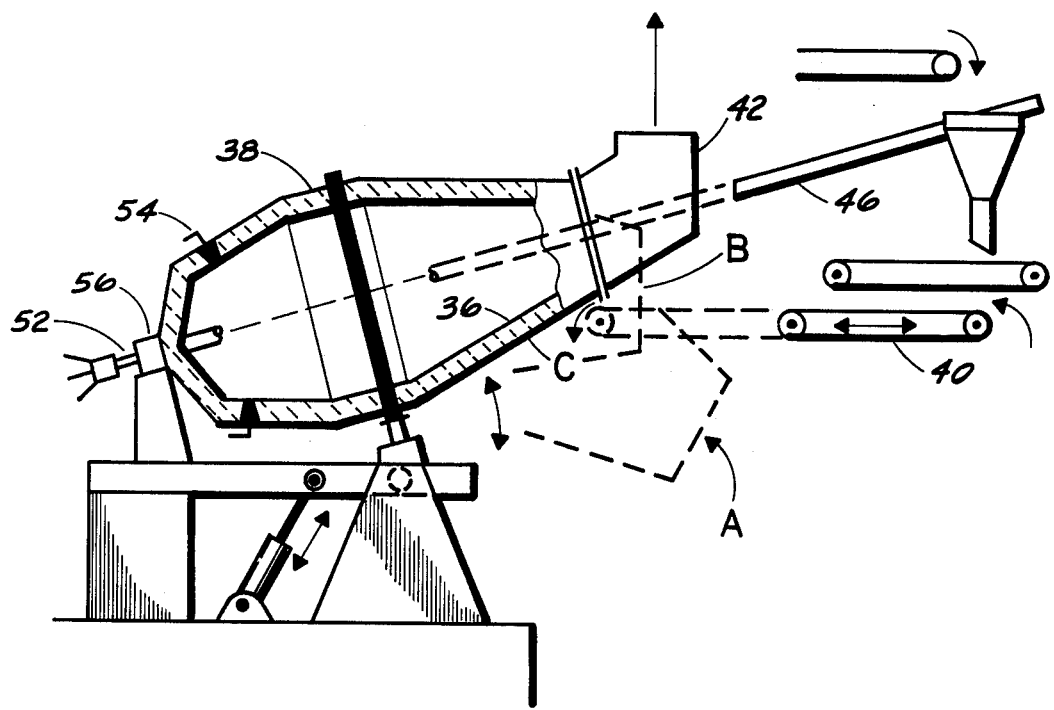
FIG. 2 is a side elevation of the inclined rotary reduction smelter of the invention.
Figure 3:
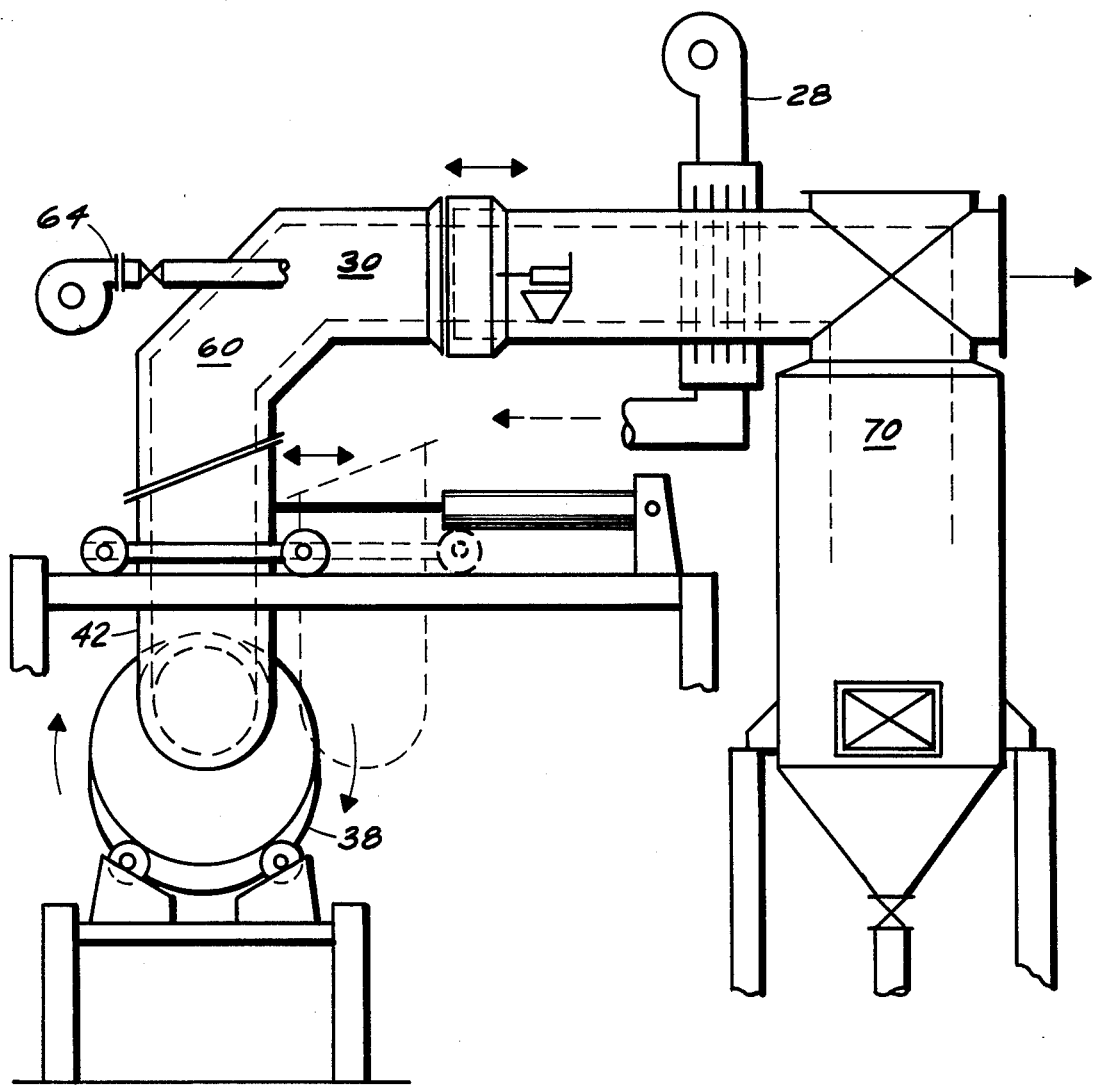
FIG. 3 is a feed-end view of the inclined rotary reduction smelter of FIG. 2, with off-gas fume hood in place, and including the off-gas afterburning and gas cooling apparatus.
Figure 4:
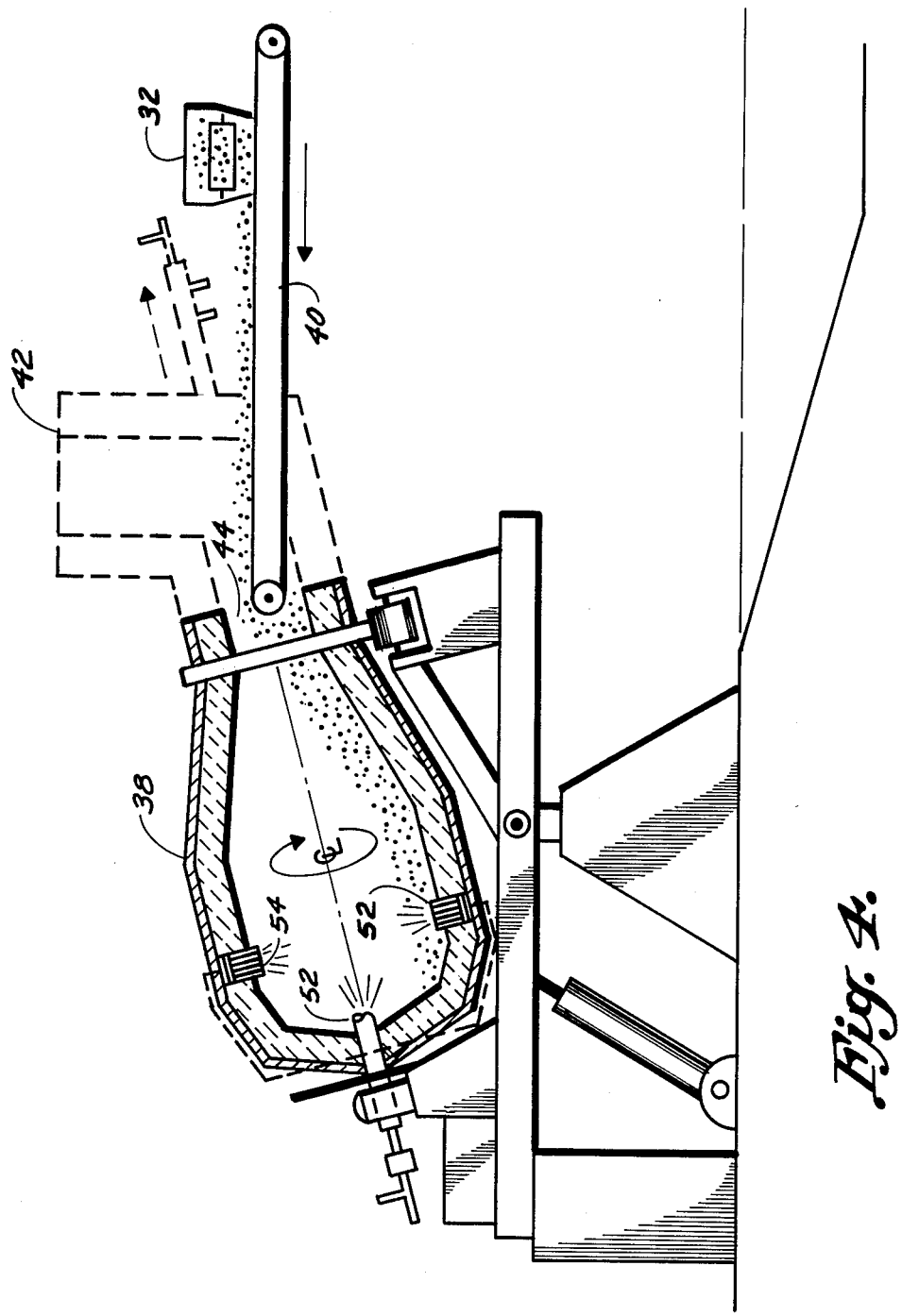
FIG. 4 is a side elevational view in cross-section of the inclined rotary reduction smelter apparatus, further illustrating the batch charging apparatus during batch charging operation.

Referring now to the drawings, and particularly to FIG. 1, the process flow and apparatus relationships are illustrated. Electric arc furnace (EAF) flue dust from the EAF dust collecting system or storage bin 10 is delivered by screw or pnuematic conveyors 12 to a flue dust day bin 14. Coal or coke from solid reductant bin 16 provides the principal reductant for the process. A binder for making a strong greenball pellet, preferably an organic, cellulose-based colloidal binder, is stored in binder bin 18.

In order to pelletize greenballs, raw materials from bins 14, 16, and 18 are metered onto screw conveyor 20, which transports the materials to mixer 22. The reductant feed rate to the mixture is determined by the iron (Fe) content of the EAF dust. It has been determined by practice that for each pound of iron, 0.35 to 0.50 pounds of fixed carbon is required, depending on the desired end product. Feed weights from each bin are controlled by load cells connected to each bin. During mixing, approximately ten to thirteen percent water is added to achieve proper pelletizing composition, depending on the nature of the flue dust and the type of reductant used in a particular plant. The mixed material is conveyed from the mixer 22 to pelletizing disc 24 by which greenballs are formed. Both the mixer 22 and pelletizing disc 24 are commercially available apparatus.

When properly controlled, the pelletizing disc 24 acts as an autosizer, and no screening is required prior to the pellets being fed to pellet dryer 26. Air preheated to approximately 300° C. by a heat exchanger 28 in waste gas afterburner 30 is blown and sucked through the pellet dryer, first in a downdraft direction and second in an updraft direction. The pellet dryer 26 and subsequent batch charging system 32 is sized to hold the live load of a unit charge. This prevents flow problems inherent with greenball pellet holding bins. The pellet dryer apparatus 26 is unique, and intended for application only in association with the process of this invention. In certain situations, the pellet dryer may not be required in the process and may be omitted.

The batch charging system 32 contains a unit charge of previously dried pellets. When the demand is made for a new batch, the system will convey a properly sized batch of pellets onto the preheating hearth 36 of the inclined rotary reduction smelter 38. Retractable feeder 40 moves into the charge or feed position in the preheat hearth 36 of the smelter and discharges the unit batch into the smelter.

The inclined rotary reduction smelter 38, as illustrated in FIGS. 2 and 4 through 8, is a multi-function vessel, having the abilities to rotate at various speeds and tilt to positions A and B to discharge its burden and take on a new batch respectively. When a new batch is introduced into the smelter, the rotation rate is reduced to a slow speed to allow minimum rolling of the pellet bed while the material is in the preheating position. As soon as the unit batch is placed on the preheat hearth 36, the smelter returns to operating position C, the movable fume hood 42 is returned to operating position covering the smelter charge opening 44, the retractable burner 46 is inserted to the position shown in FIG. 6 and fired in oxidizing mode to rapidly raise the temperature of the batch to about 600° C. to complete devolatilization of the admixed coal (reductant) in the pellets, and reduction of the metal oxides begins. The smelter rotation speed is slowly increased to rotate the bed and move the batch down to the operating position. The rotation speed is controlled to prevent the pellet batch from sticking to the hot hearth walls.

The gas feed to retractable burner 46 is controlled to maintain a slightly oxidizing atmosphere as smelter off-gases are monitored for excess oxygen content while the heat-up of the batch continues. When the batch temperature reaches about 900° C., and as reduction of metal oxides increases, the retractable burner gas feed is adjusted to a slightly reducing atmosphere while the batch temperature is raised to 1050° C. to 1150° C.

When the rate of oxide reduction decreases, the exit gas from the smelter again becomes oxidizing and the reduction process is complete. The process can be stopped at this point by decreasing the gas feed to the retractable burner 46, and retracting it into the movable fume hood 42. The fume hood is then removed to clear the mouth of the smelter vessel, and the smelter is tilted to casting position from which the burden is dumped into a rotary cooler 50, in which the cooling atmosphere is controlled to produce either metallized pellets or reoxidized pellets. Before the movable fume hood 42 is retracted from the operating position, the smelter and afterburner atmospheres must be oxidizing. During casting operations, air is injected through melting burner 52 to maintain a positive oxidizing atmosphere in the smelter.

In order to melt the burden in the smelter, the following procedure is followed. As the rate of reduction decreases, the batch temperature rises indicating the reduction process is nearing completion. Fuel gas injection through melting burner 52 is increased to create additional heat with an attendant increase in the melting rate. Oxygen, air, and/or fuel are injected through tuyeres 54, porous plugs, or other ceramic elements, to combine with the excess carbon both carried in the pellets and added separately to the burden, and thus the batch is quickly melted. Oxygen, fuel, and air are delivered to the interior of the rotating vessel through rotary coupling 56.

When melting is completed, the movable fume hood 42 is retracted to the open position. As soon as the fume hood clears the mouth of the smelter, the casting sequence begins. The slowly rotating smelter is tilted to the casting position shown in FIG. 8, and the liquid contents are slowly poured into a tundish where a partial slag/iron separation is made. Liquid iron and the remaining slag are diverted either into a pig machine or into an iron shot-making vessel. Alternatively, the molten material is simply dumped into a prepared sand mold pit for cooling. The casting pit is hooded to divert casting dust and fumes into an afterburner bypass duct leading to the process dust collector 58.

Upon completion of the casting sequence, the inclined rotary reduction smelter 38 is returned to charging position and the batch charging process is repeated.

Processing time and temperature ranges for each operating sequence are approximately as follows:

The smelter is in the casting position for about 5 to 10 minutes at normal operating temperature.

The charging position requires about 5 minutes.

The smelting vessel is in the preheating position about the same length of time as the charging position, as preheating can occur during charging.

The smelting vessel is in the operating position about 5 to 10 minutes for the batch temperature to reach 600° C. while the atmospheric temperature within the vessel increases to 900° C.;

about 10 to 15 minutes while the batch temperature rises to 900° C. while the atmospheric temperature within the vessel increases to 1100° C.;

about 10 to 15 minutes for the batch to reach 1050° C. to 1150° C. at which temperature the batch is maintained until reduction is complete.

Depending on the pellet analysis of the particular batch, the time to process each batch will vary between 35 and 55 minutes to complete reduction.

To continue the process to melt the batch or burden, the atmospheric temperature within the vessel is increased to the range of 1500° C. to 1650° C. by utilizing an oxy-fuel melting burner 52 and optional injection of oxygen and/or fuel under the burden within the smelter. Melting is completed in 15 to 20 minutes depending on the composition of the pellet batch.

Thus, it is seen that one entire sequence of batch operation requires between 35 and 55 minutes to complete reduction of the pellet batch, plus an additional 15 to 20 minutes to complete the melting procedure, if melting should be the operating mode.

It is well known in the art that it is difficult to maintain a positive atmospheric seal with rotating furnaces to prevent gas leakage from such vessels. In any case where heavy metal fumes may be expelled from the process, it is vital that gas leakage to the surrounding work area be prevented. Semi-positive sealing means as provided by metal-to-metal slip-seals, or labyrinth-type seals are expensive to construct and maintain. This invention utilizes an air gap between the lip of the inclined rotary reduction smelter 38 and the movable fume hood 42 to provide limited air intake, and thus provide a positive gas seal. The air intake gap is approximately 3 mm to 6 mm of space between the rotatable vessel 38 and the stationary fume hood 42 in which a negative pressure is maintained. Pressure kicks and pressure pulses are avoided by predrying the green pellets to prevent the sudden release of steam within the smelter furnace. The movable fume hood 42 is provided with both temperature and oxygen sensing instruments which provides process control data. Both the retractable burner 46 and the melting burner 52 are controlled by output signals from fume hood sensors according to the mode of operation.

Figure 5:
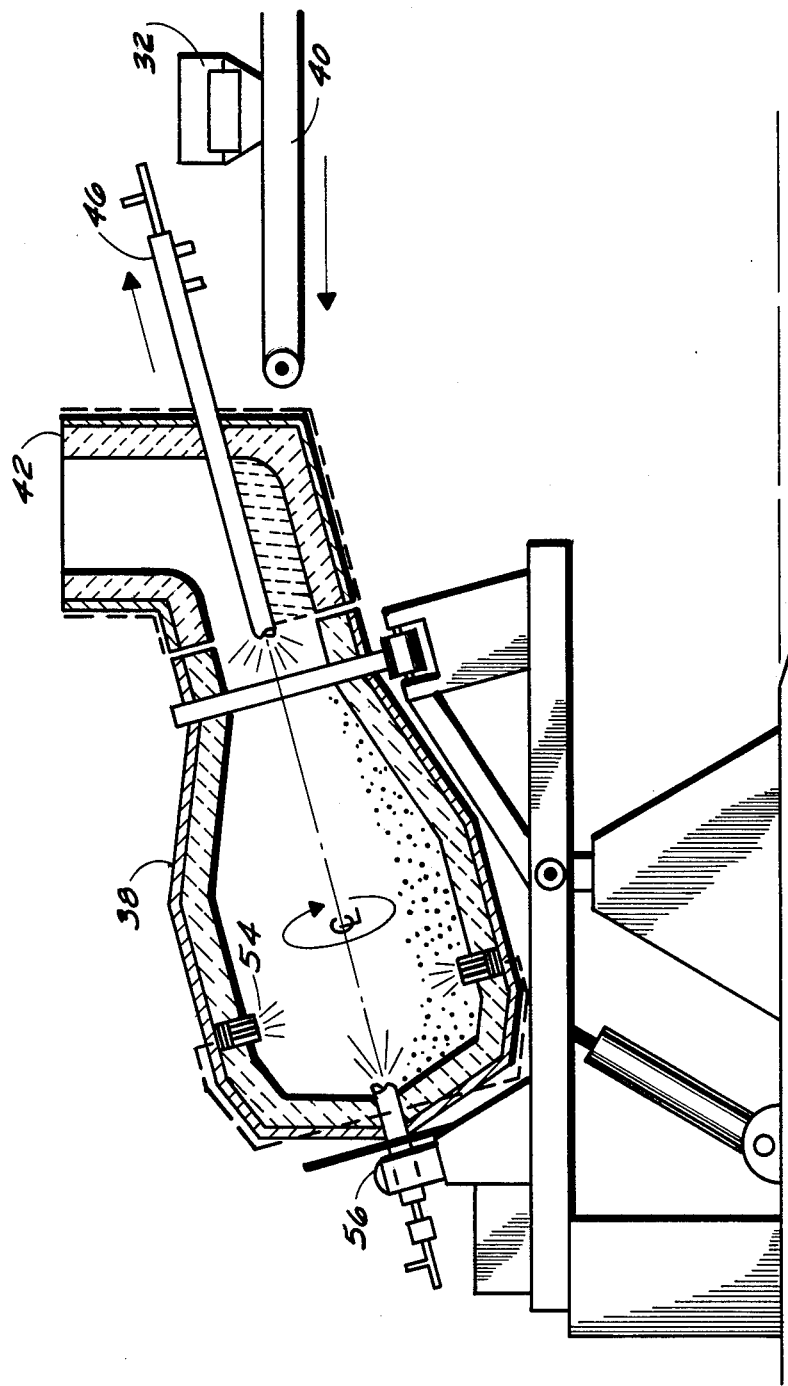
FIG. 5 is a side elevational view in cross-section similar to FIG. 4, further illustrating the positions of the invented apparatus with the fume hood in the operating position, with the batch charging apparatus retracted, and with the retractable burner in the smelter heat-up position.
Figure 6:
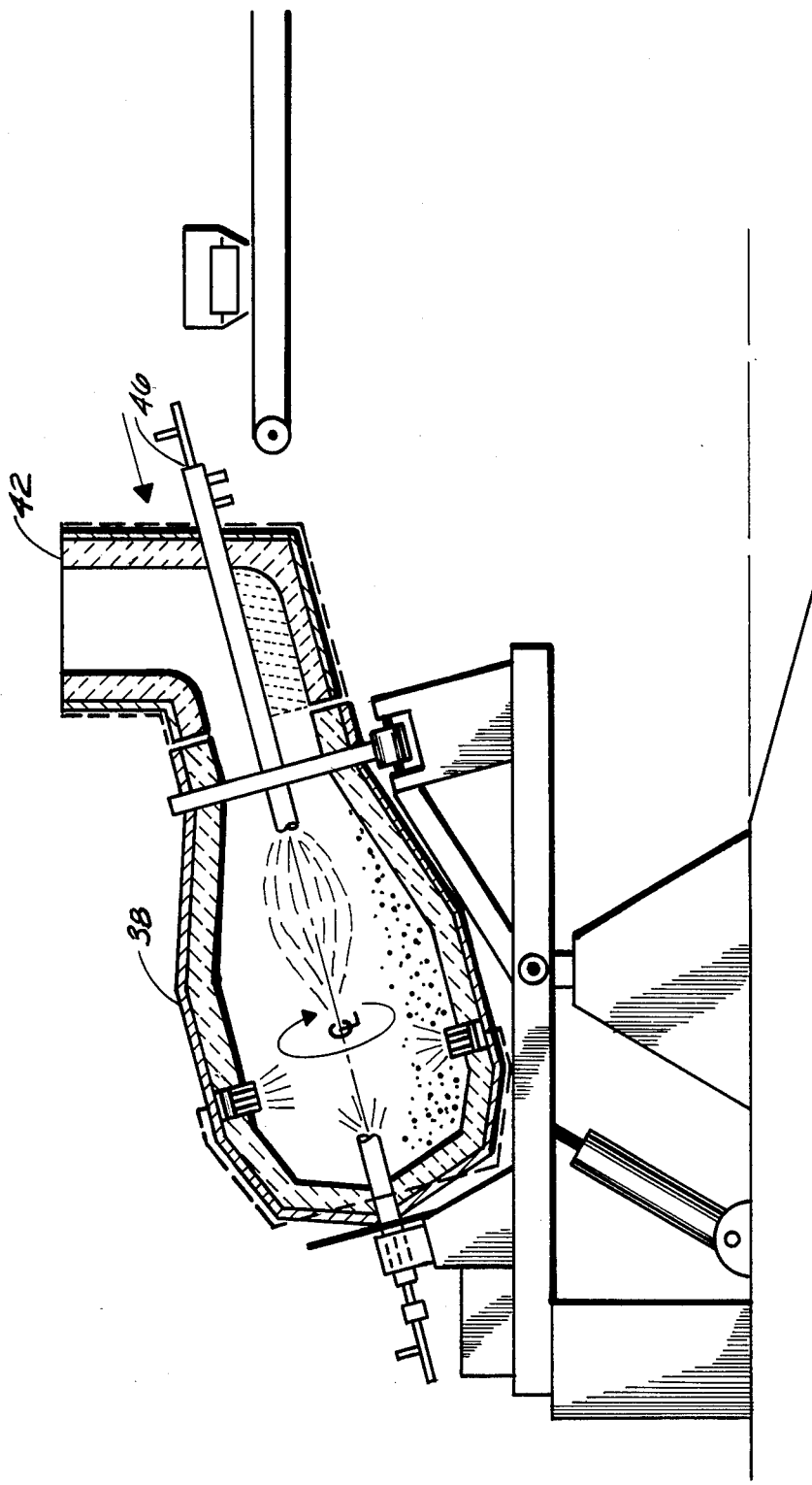
FIG. 6 is a side elevation view similar to FIG. 4, showing the rotary reduction smelter in the operating position with the retractable burner in the pilot position, and further showing the rotating burner and gas injection system operational.
Figure 7:
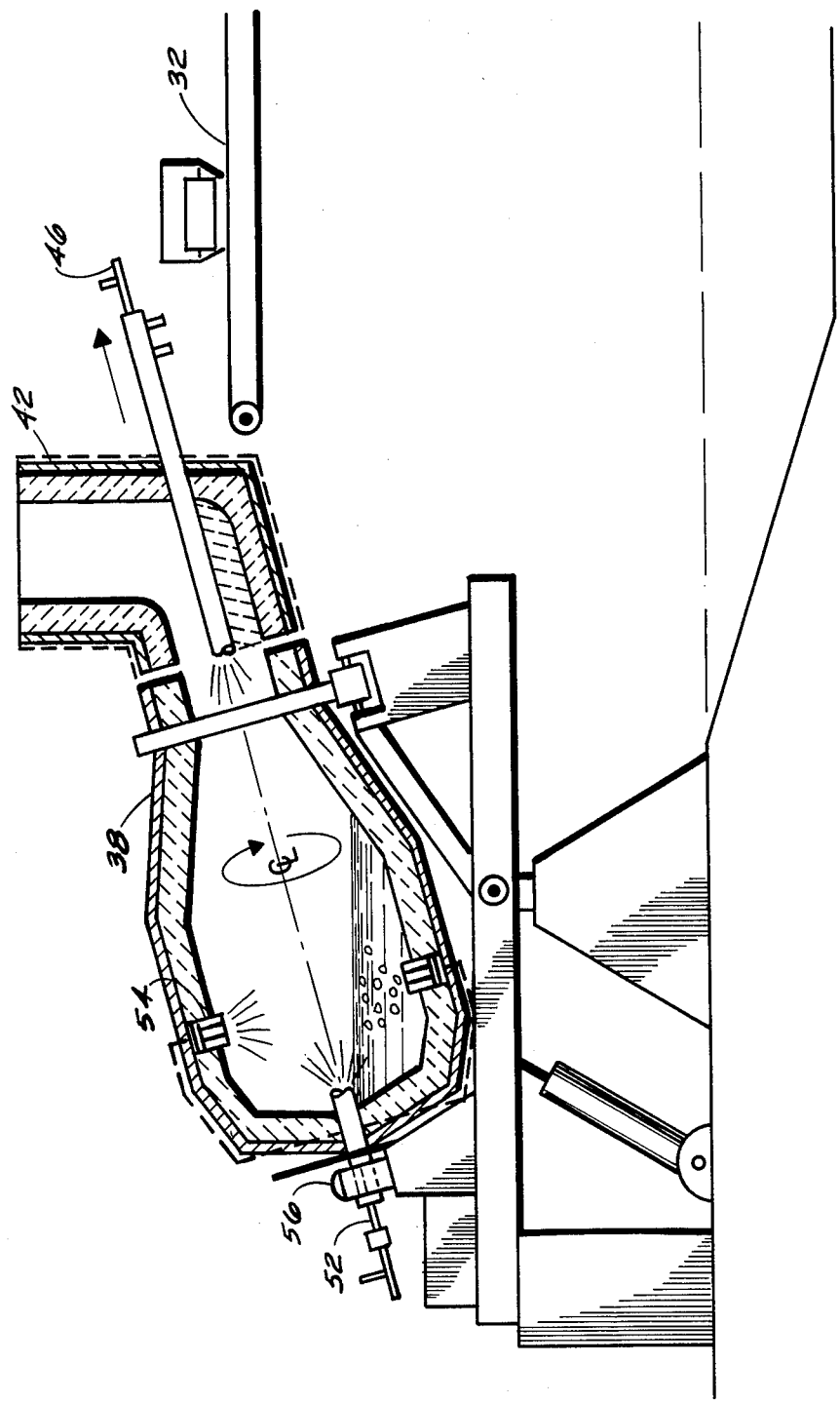
FIG. 7 is a side elevational view in cross-section view of the invention in operating position with gas injection underbed to melt down batch charge.
Figure 8:
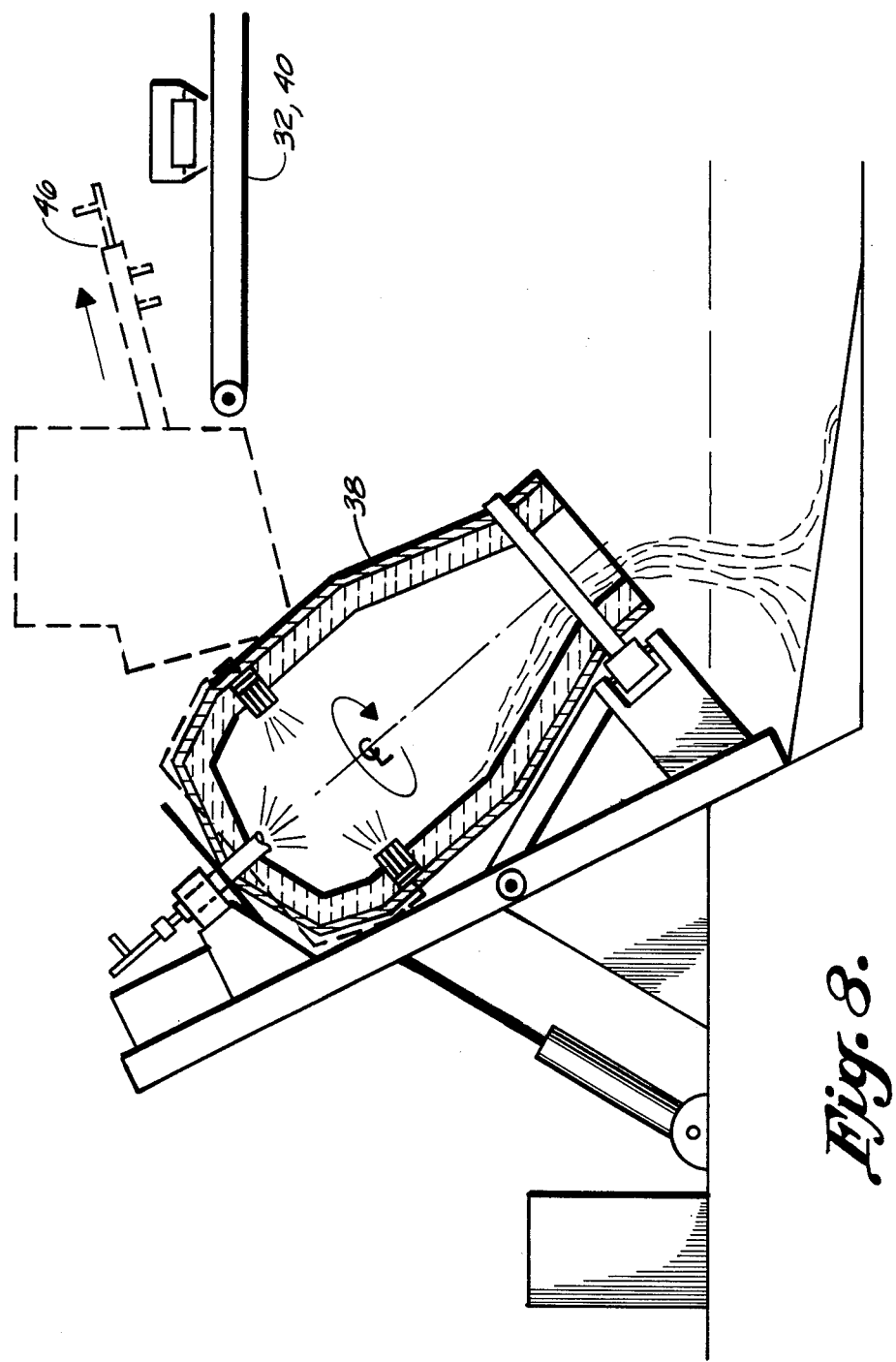
FIG. 8 is a side elevational cross-section of the rotary reduction smelter in position to discharge either solid directly reduced iron pellets, or liquid iron and slag, the latter being illustrated.
Figure 9:
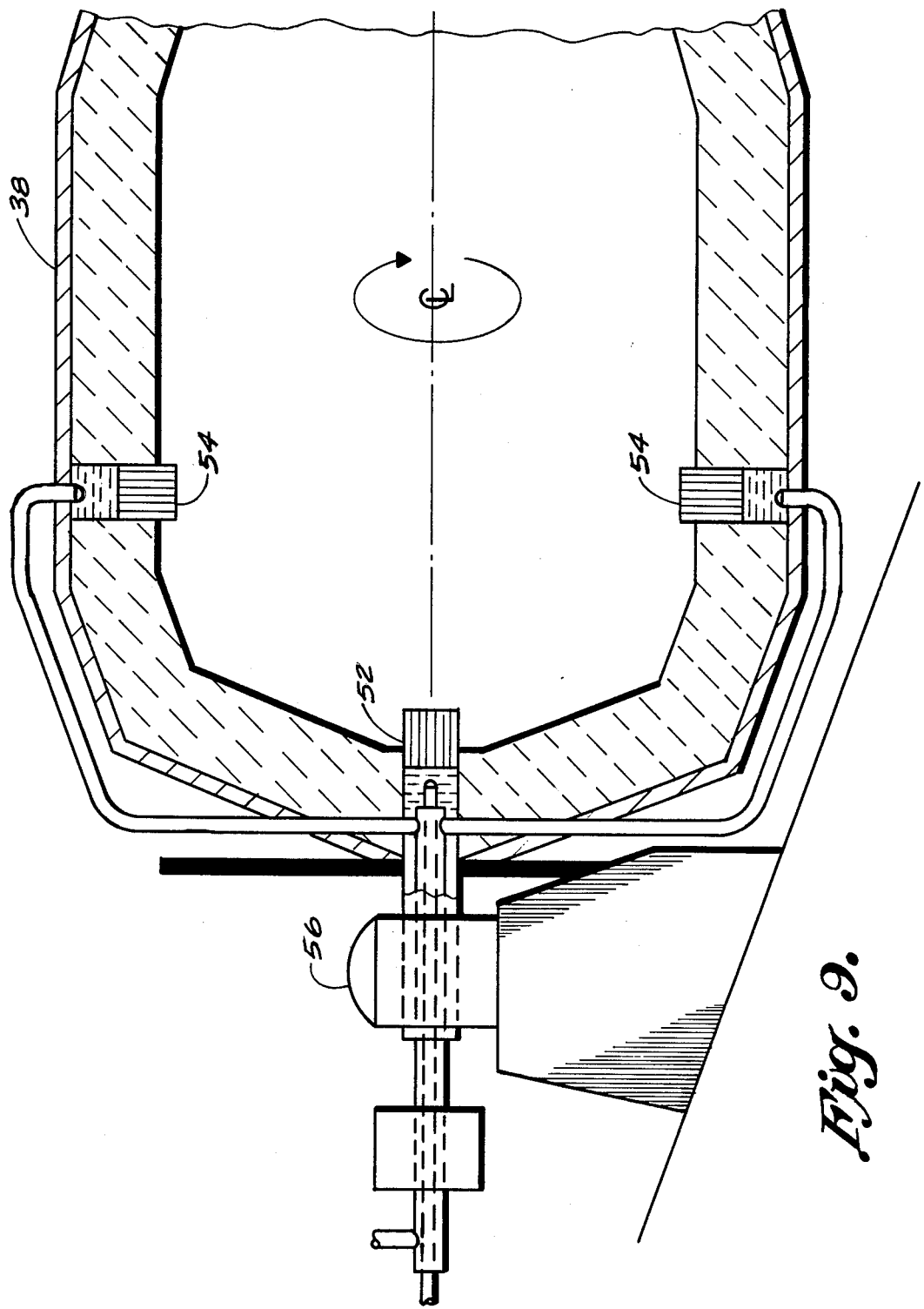
FIG. 9 is a cross section of a portion of the rotary reduction smelter, on larger scale, illustrating the gas injection apparatus, with a fixed position centerline burner and tuyeres located in the sidewall of the rotating hearth.

When the movable fume hood 42 is returned to the operating position illustrated in FIG. 5, a positive face-to-face seal is provided between the top of the fume hood and the uptake duct 60 leading to the afterburner 30.

Hot process gases are sensed for free oxygen content while passing through the movable fume hood 42 and the afterburner combustion air blower 64 is activated to provide the afterburner air requirements to complete combustion of combustable gases as well as to reoxidize volatile metals. A pilot burner 66 is provided in the afterburner to insure ignition should the refractory temperature be below the necessary ignition temperature as it is in the case of starting up the system. An excess air damper 68 is employed to provide excess combustion air plus partial gas cooling. The afterburner 30 contains a gas-to-air heat exchanger 28, from which drying air at 300° C. is generated for use in the pellet dryer 26. However, depending on the local cost for natural gas, the option to use natural gas for pellet drying may be chosen instead of using a heat exchanger in the afterburner.

Gas cooler 70 follows the afterburner 30 to accomplish gas cooling by conventional means and equipment to reduce the gas temperature sufficiently to allow the process dust collector 72 to be of conventional fabric bag-type.

The process of this invention includes the mechanical diversion of cooled waste gases from the gas cooler 70 to one of three separate compartments of the baghouse 72. The process dust collector header 74 diverts the gas stream to one of the three baghouse compartments as required by the mode of smelter operation. During preheating and devolatilization of the admixed carbon in the pellets, dust and gases from the smelter are burned, cooled, and diverted to compartment A in the baghouse 72. When reduction begins and zinc, lead, cadmium, and alkali fumes begin evolving, the waste gas streams are diverted to compartment B and then to compartment C to take advantage of the variable distillation effect of the batching process and to enhance the enrichment of the recollected zinc oxide and lead oxide dust. Recollected baghouse dust is removed from each baghouse compartment independently, and dust collected in compartment A is recycled back to mixer 22, where it is reblended with other feed materials for another pass through the smelting process. Dusts collected in compartments B and C may or may not be recycled through the smelter a second time depending on the dust composition and the market for such materials.

ALTERNATIVE EMBODIMENTS

Figure 10:
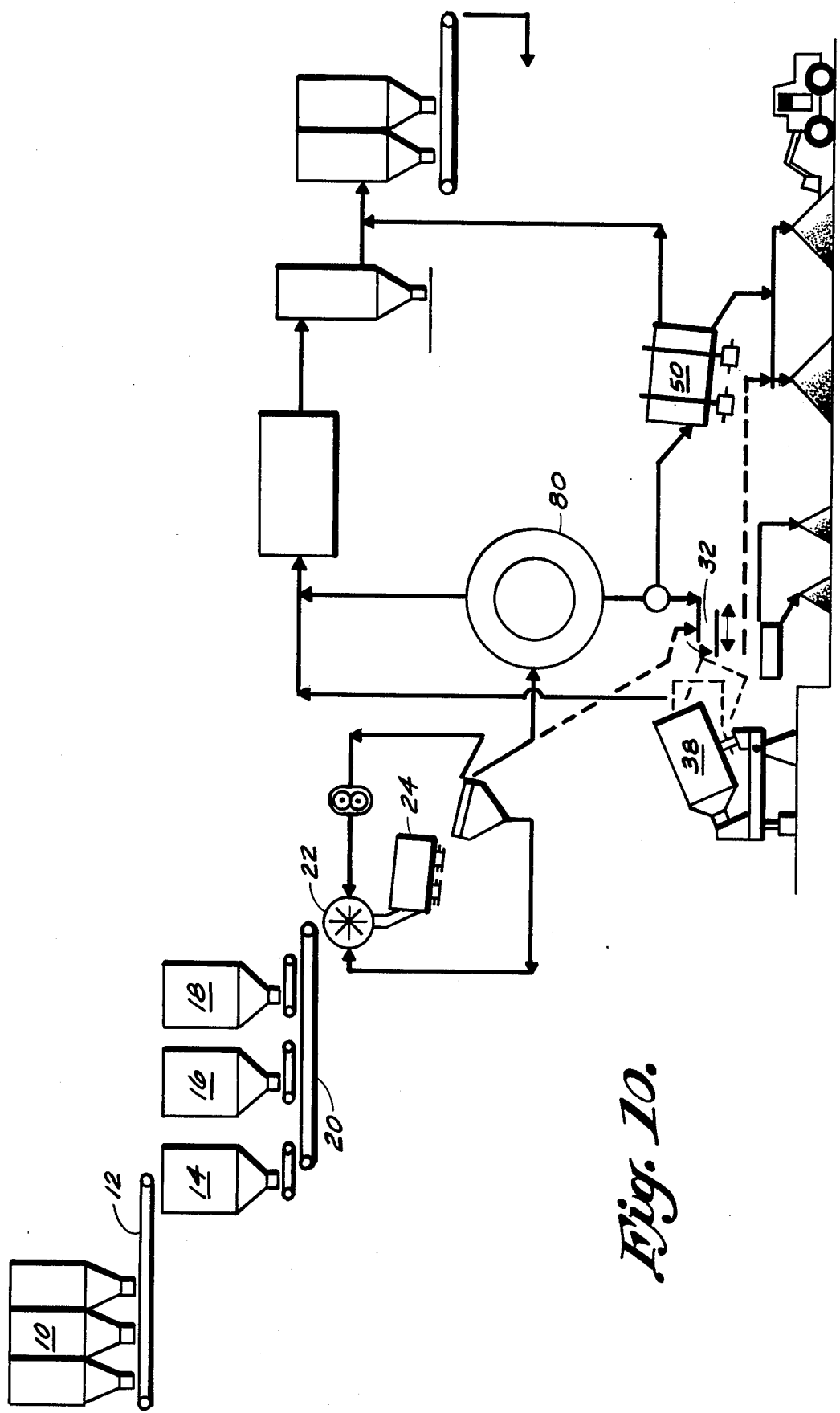
FIG. 10 is a diagramatic illustration of the process including a rotary hearth direct reduction apparatus in the flowsheet.

FIG. 10 shows an alternative embodiment in which the pellets are passed through a rotary hearth direct reduction furnace 80 prior to being fed to the inclined rotary reduction smelter 38. Means are provided for bypassing the rotary hearth furnace if the pellets need not be pre-reduced.

In some instances of any embodiment described, the pellet dryer may not be required in the operation of the process.

SUMMARY OF THE ACHIEVEMENTS OF THE OBJECTS OF THE INVENTION

From the foregoing, it is readily apparent that we have provided a small-scale flue dust recovery plant that can be operated on a discontinuous basis, without costly degradation to the systems refractories. Our invention provides economic application "on-site" at mini-steelmills for the purpose of recycling hazardous EAF flue dust into recyclable, and/or non-hazardous materials, including directly reduced iron pellets, or pig iron and slag, and a highly reconcentrated zinc and lead oxide dust/ore. In addition, the invention provides a batch process which selectively distills and recovers reconcentrated zinc oxide dust, lead oxide dust, and process gangue dust separately. The apparatus has sufficient operating flexibility to allow feed material to be converted to solid-state directly reduced iron, or to be melted to form liquid iron and slag, while distilling volatile heavy metals for subsequent recovery in an off-gas cooling and dust collection system. It also provides means to convert hazardous waste flue dust which has no direct commercial value into marketable products and by-products, and non-hazardous waste materials that can be safely disposed of according to the EPA EP Toxicity Regulations.

Lastly, our invention provides means to terminate the existence of certain flue dust and sludge materials as hazardous waste.

What is claimed is:

1. Apparatus for treating dust and sludge contaminated with heavy metals and heavy metal oxides, comprising;
   waste material storage means;
   a mixer;
   means communicating with said waste material storage means and said mixer for introducing said waste material, solid carbonaceous material, and an organic binder to said mixer;
   a pelletizing device;
   means for introducing material from said mixer into said pelletizing device;
   pelletizer discharge means;
   an inclined rotary reduction smelter vessel having a charging and pouring opening in one end thereof;
   means for introducing pellets from said pelletizer discharge means to said rotary reduction smelter vessel;
   retractable burner means for heating the interior of said smelter vessel;
   means for rotating said smelter vessel about its inclined axis; and
   means for tilting said smelter vessel about a horizontal axis.

2. Apparatus according to claim 1 further comprising a fume hood adapted for sealing engagement with the charging opening of said smelter vessel.

3. Apparatus according to claim 1 wherein said means for introducing pellets to said smelter vessel is mounted for reciprocable movement into and out of the charging opening in said vessel.

4. Apparatus according to claim 2, further comprising an afterburner mounted within a gas pipe at the exit of said fume hood.

5. Apparatus according to claim 1, further comprising a pellet dryer communicating with said pelletizer discharge means, said dryer having means therein for forcing heated air downwardly and upwardly through pellets on a conveyor means passing therethrough.

6. Apparatus according to claim 1, further comprising a means for collecting off-gases from said smelter vessel, gas cleaning apparatus engageable with said off-gas collecting means and means for passing said off-gases through said gas cleaning apparatus.

7. Apparatus according to claim 6, further comprising means for selectively returning materials removed from said off-gases to said mixer.

8. Apparatus according to claim 1, further comprising means for sizing pellets exiting said pelletizing device.

9. Apparatus according to claim 1, further comprising a direct reduction furnace, means for introducing said pellets to said direct reduction furnace, and means for introducing directing reduced pellets from said furnace to said smelting vessel.

10. An inclined rotary reduction smelting vessel comprising:
    a steel shell;
    a refractory lining within said steel shell;
    a charging and pouring opening at one end of the vessel, said vessel being mounted for rotary motion about a central axis and for tilting motion about a horizontal tilting axis.

11. Apparatus according to claim 10 wherein said tilting axis is external to said smelting vessel.

12. Apparatus according to claim 10, further comprising a hood removably mountable over the charging and pouring opening of said smelting vessel.

13. Apparatus according to claim 10, further comprising a retractable burner adapted to be inserted into said smelting vessel through an orifice in said hook.

14. Apparatus according to claim 10, further comprising means for injecting gases and/or fuels into said rotary smelting vessel.

15. Apparatus according to claim 14, wherein said means for injecting gases is selected from the group comprising tuyeres, porous plugs, and ceramic elements.

16. Apparatus according to claim 13 wherein said burner is a water cooled, retractable, oxy-fuel burner adapted to be progressively positioned at variously heating locations, and withdrawn into a movable fume hood during casting and charging operations.

* * * * *